United States Patent Office

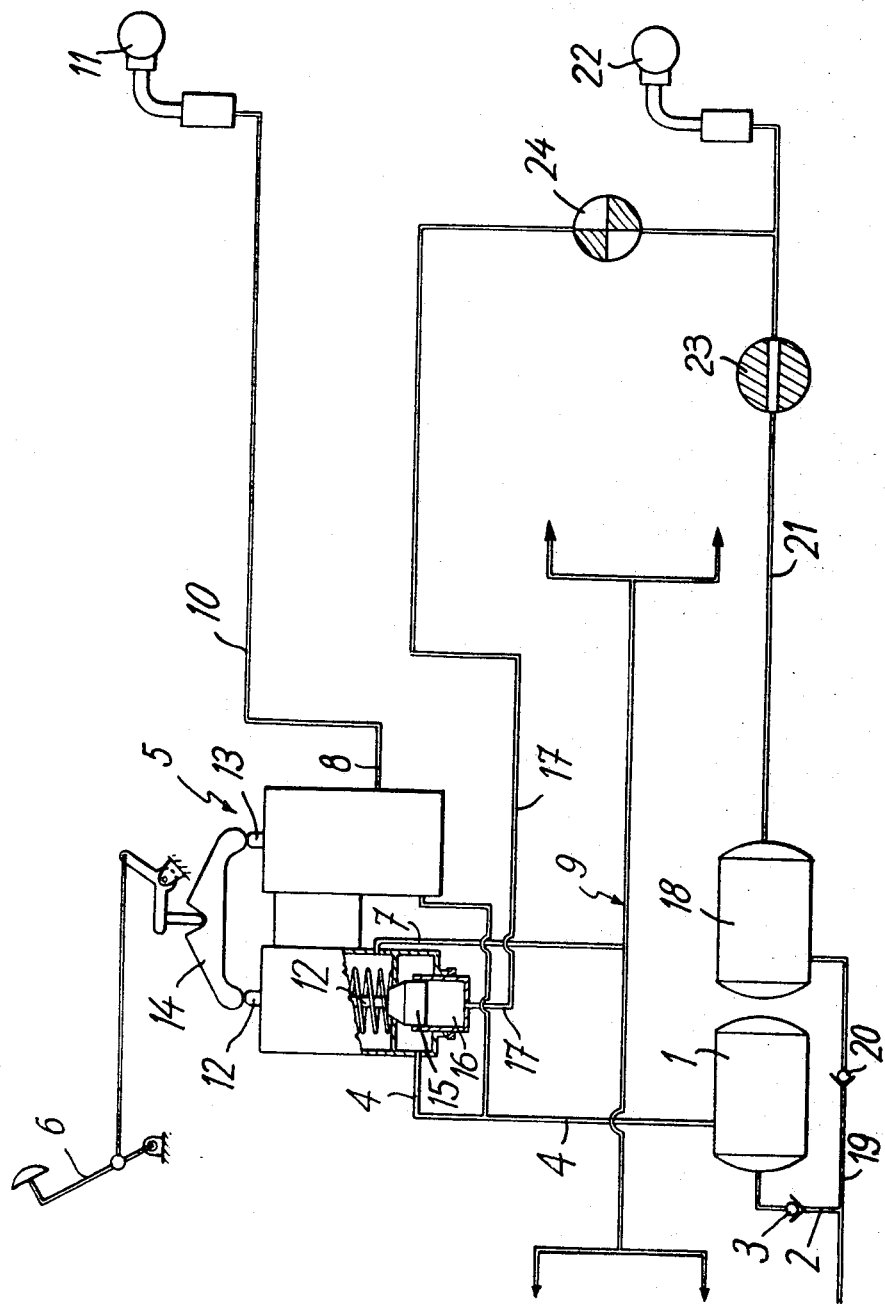

3,419,314
Patented Dec. 31, 1968

3,419,314
BRAKING SYSTEMS FOR TRACTORS AND TRAILERS
Edmond Henry-Biabaud, Paris, France, assignor to Societe Anonyme Andre Citroen, Paris, France, a French society
Filed Nov. 28, 1967, Ser. No. 686,134
Claims priority, application France, Dec. 15, 1966, 87,606
2 Claims. (Cl. 303—7)

ABSTRACT OF THE DISCLOSURE

This invention relates to braking systems for a tractor and trailer unit of the kind that comprises a main tank to contain fluid under pressure for feeding a distributor having a distributor valve and at least two outputs connected respectively to a braking circuit of the trailer and to a braking circuit of the tractor and a secondary tank to directly feed a reserve circuit of the trailer by means of a decoupling valve preceded by a closing valve. In accordance with the invention, a take-over pipe is connected between said decoupling valve and said closing valve and the take-over pipe feeds a jack having a moving member which acts on the distributor valve in the direction opposite that of the action of a brake-actuating member, such as a brake pedal.

---

It is known that braking systems in a tractor and trailer unit generally comprise a main tank containing fluid under pressure for feeding the two normal braking circuits of the tractor and of the trailer respectively.

The tank is connected to the input of a distributor having two outputs, controlled by the brake pedal.

It is also necessary to provide on the tractor a secondary tank directly feeding a reserve braking circuit of the trailer. This circuit operates by depression and essentially comprises a valve known as a decoupling valve preceded by a closing valve, both being mounted on the tractor and connected in series in the pipe leading from the secondary tank.

It is known moreover that normal safety requirements prescribe that the braking of the trailer is effected before that of the tractor. To this end, various devices have been proposed which are mounted on the distributor and which enable a "priority" or "predominance in time" to be given to the braking of the trailer with respect to the braking of the tractor.

There is generally provided an adjustable spring which acts on the valve of the braking circuit of the tractor in the direction opposite that of the action of the brake pedal.

However, this solution presents the disadvantage of allowing an awkward delay to exist in the braking of the tractor with respect to the action on the brake pedal when the trailer is no longer coupled to the tractor. It will be understood that the expression "tractor" includes any vehicle used to draw the trailer.

The invention has for its object improvements remedying the disadvantage referred to above, by automatically eliminating the "priority" of the braking of the trailer if this latter is not coupled.

To this end, according to the invention, a pipe, hereinafter referred to as a "take-over" pipe, is connected between the decoupling valve and the closing valve of the reserve circuit, this pipe moreover being connected to a jack whose movable member acts, in the distributor, on the valve of the braking circuit of the tractor in the direction opposite that of the action of the brake pedal. However, it will be apparent that the term "jack" used above does not limit the invention and that the movable member of this jack may be constituted by the valve itself moving in a chamber subjected to the pressure prevailing in the "take-over" pipe.

The invention will moreover be more readily understood and various secondary characteristics will appear in the course of the description of an advantageous embodiment with reference to the accompanying drawing which depicts a system according to the invention. In this system, the distributor comprises only two outputs, the braking circuit of the trailer itself comprising a single pipe, but the invention may of course be applied in the case of distributors having more than two outputs.

Referring now to the drawing, this shows a braking system comprising a main tank 1 containing fluid under pressure, preferably compressed air supplied by a pump (not shown) through a pipe 2 provided with a non-return valve 3. A pipe 4 connects the tank 1 to a distributor designated by the general reference 5 controlled by the tractor vehicle brake pedal 6. The distributor comprises two outputs 7 and 8 which respectively feed the braking circuit 9 of the tractor on which the system is mounted, and the braking circuit 10 of the trailer. At the rear end of the tractor is mounted a coupling valve 11 on the circuit 10 and permitting the connection to the braking members provided on the trailer. These latter, of a conventional type, have not been shown and essentially comprise, as is known, brake cylinders which may be fed by fluid under pressure present in the circuit 10. The distributor 5 essentially comprises two valves operated by push members 12 and 13 and permitting communication between the input pipe 4 and the outputs 7 and 8. However, it must be noted that a balance bar 14 or the like is interposed between the brake pedal 6 and the push members 12 and 13 and enables an absolute synchronisation of the movement of the push members to be avoided under certain circumstances which will be hereinafter set forth.

Only the valve 15, associated with the push member 12 and mounted on the output 7 of the tractor braking circuit has been schematically shown, the other valve being of a conventional type.

As may be seen in the figure, the valve 15 moves in a jack chamber 16 in the fashion somewhat of a piston, this chamber being provided with a pipe 17, the purpose of which will appear later.

The braking system further comprises a secondary tank 18 fed by a pump (not shown) by means of a pipe 19 in which is mounted a non-return valve 20. A pipe 21 leads from the secondary tank 18 and reaches the rear of the tractor at a valve 22, known as "decoupling" valve, whilst a closing valve 23 is provided upstream of the valve 22.

A reserve or safety braking circuit (not shown) is mounted on the trailer, and comes into operation with lack of pressure, the pipe of this reserve circuit normally being connected to the valve 22 and subjected to the pressure of the fluid in the tank 18.

Between the valves 22 and 23, the pipe 21 is connected to the pipe 17, known as the "take-over" pipe, preferably by means of a reducing valve 24.

When the trailer is coupled to the tractor, the braking circuits (normal and reserve) of the trailer are respectively connected to the valves 11 and 22, the closing valve 23 being in its open position.

The pressure of fluid in the tank 18 which keeps the shoes of the reserve brake of the trailer in the "off" condition, is transmitted to the chamber 16 of the distributor 5, possibly reduced by a predetermined ratio, by the reducing valve 24.

An upwardly directed stress is therefore exerted on valve 15.

When the driver presses on the brake pedal 6, the stress exerted upwardly onto the valve 15 opposes, in a first stage, its downward displacement. Due to the presence of the balance arm 14, only the valve associated with the push member 13 is opened and the compressed air is firstly directed to the braking circuit 10 of the trailer. When the pressure increases in this circuit and the driver continues to press on the pedal 6, the valve 15 opens, giving the compressed air passage to the braking circuit of the tractor.

The presence of the take-over pipe 17 and the action of the pressure of the secondary tank 18 on the valve 15, thus permits a "priority" or "predominance in time" of the braking of the trailer with respect to the braking of the tractor.

If the tractor vehicle is used without a trailer, the valve 11 is closed whilst the valve 22 is kept open. The valve 23 is also placed in its closing position so that the take-over pipe 17 is in communication with the atmosphere.

When the driver presses on the pedal 6, no reaction stress will oppose the downward movement of the push member 12 and the valve 15.

The braking of the tractor will thus be ensured without delay.

I claim:
1. In a braking system for a tractor and trailer unit that comprises a main tank to contain fluid under pressure for feeding a distributor having a distributor valve and at least two outputs connected respectively to a braking circuit of the trailer and to a braking circuit of the tractor, and a secondary tank to directly feed a reserve circuit of the trailer by means of a decoupling valve preceded by a closing valve, the improvement which consists in that a take-over pipe is connected between said decoupling valve and valve for closing said reserve circuit, said take-over pipe feeding a jack having a movable member which acts on said distributor valve of the braking circuit of the tractor, in the direction opposite that of the action of a brake-actuating member.

2. A system according to claim 1, wherein a reducing valve is connected in said take-over pipe.

References Cited

UNITED STATES PATENTS 2,680,654  6/1954  Edge et al. _____ 303—53

MILTON BUCHLER, *Primary Examiner.*

J. J. McLAUGHLIN, *Assistant Examiner.*

U.S. Cl. X.R.
303—8, 29, 53